United States Patent [19]
Malkin

[11] 3,841,485
[45] Oct. 15, 1974

[54] AUTOMATICALLY BACKWASHED GRAVITY FILTER

[75] Inventor: William J. Malkin, Fort Lee, N.J.

[73] Assignee: The Permutit Company, Inc., Rochester, N.Y.

[22] Filed: May 8, 1972

[21] Appl. No.: 251,012

[52] U.S. Cl.................. 210/104, 210/108, 210/275
[51] Int. Cl............................................. B01d 23/24
[58] Field of Search...... 210/80, 108, 110, 275–278, 210/416

[56] References Cited
UNITED STATES PATENTS

| | | | |
|---|---|---|---|
| 630,988 | 8/1899 | Reiseat | 210/108 |
| 1,119,008 | 12/1914 | Gibson | 210/108 |
| 1,195,391 | 8/1916 | Newman | 210/110 |
| 2,879,891 | 3/1959 | Beohner et al. | 210/275 X |
| 2,907,460 | 10/1959 | Welch | 210/110 |
| 3,032,212 | 3/1970 | Veda | 210/108 X |
| 3,587,861 | 6/1971 | Ross | 210/416 X |
| 3,627,131 | 12/1971 | Goodman et al. | 210/108 X |

Primary Examiner—John Adee
Attorney, Agent, or Firm—Theodore B. Roessel; James A. Rich

[57] ABSTRACT

An automatically backwashed gravity filter is provided with means, such as an automatic level controller, for detecting the fluid level in a backwash storage compartment; and means for adjusting the supply rate of unfiltered fluid in proportion to changes in the fluid level in the backwash storage compartment. As a result, the backwash initiation point is relatively independent of the flow rate through the filter. The filter is also provided with an outlet conduit through which filtered fluid is discharged before the maximum amount of fluid has accumulated in the backwash storage compartment. Thus, clearwell storage requirements are reduced.

7 Claims, 3 Drawing Figures

AUTOMATICALLY BACKWASHED GRAVITY FILTER

BACKGROUND OF THE INVENTION

This invention relates to filtration, and more particularly to an improved automatically backwashed gravity filter.

Some gravity filters are equipped with means to backwash the filter media automatically when the inlet pressure exceeds a certain level. Typical examples are illustrated in U.S. Pat. Nos. 2,879,891-Beohner et al., 2,879,893-Stebbins, 3,193,099-Soriente et al., 3,298,523-Johnson and 3,502,212-Ueda. Filters such as these are generally divided into three compartments: a filter compartment containing a bed of the filter media, an underdrain compartment beneath the filter compartment, and a backwash storage compartment above the filter compartment. Typically, the backwash storage compartment is connected to the underdrain compartment by one or more tubes which extend through the filter compartment.

In these filters, in each filtration cycle the first portion of the filtered fluid is stored in the backwash storage compartment. After the backwash storage compartment is filled to the desired level, fluid is discharged to service through an outlet conduit, which may be connected to either the underdrain compartment or the backwash storage compartment.

During the remaining portion of each filtration cycle, the fluid level in the backwash storage compartment remains relatively constant. Thus, the pressure in the underdrain compartment remains relatively constant and the pressure on the inlet side of the filter compartment varies directly with the pressure drop across the filter bed. As the bed becomes clogged with impurities from the fluid being filtered, the pressure drop across the bed and the inlet pressure increase gradually. Various means, such as syphons, pressure switches and float switches, are used to trigger a backwash cycle when the inlet pressure exceeds a certain level. During the backwash cycle, the fluid stored in the backwash storage compartment flows back into the underdrain compartment, up through the filter bed, and out through a backwash discharge pipe connected to the inlet side of the filter compartment.

As long as the flow rate through the bed remains relatively constant, the backwash cycle will be initiated at approximately the same point in each filtration cycle. However, if the flow rate varies, which is usually the case in practice, the pressure drop across the bed will vary with the flow rate. Thus, the backwash initiation point will vary. At higher flow rates, the backwash cycle will be initiated with fewer impurities in the bed. Thus, the filter will be backwashed more frequently and the time spent and water consumed in backwashing the bed will be increased. Conversely, at lower than normal flow rates, the amount of impurities required to trigger backwashing will be increased and the quality of the filtered fluid may deteriorate.

Another drawback of filters such as these is that the backwash storage compartment must be refilled after each backwash cycle before fluid can be discharged to service. With typical supply and backwash flow rates, it takes about five times as long to fill the backwash storage compartment as it does to wash the bed. Thus, for a 4 minute wash cycle, which is typical, the filter is out of service for about 25 minutes. As a result, the filtered fluid from filters such as these is usually fed to a clearwell storage tank having enough capacity to handle the maximum demand rate on the filter during the time required to backwash the filter and refill the backwash storage compartment.

SUMMARY OF THE INVENTION

It is an object of this invention to provide improved automatically backwashed gravity filters.

Another object is to provide automatically backwashed gravity filters wherein changes in the flow rate do not cause significant changes in the backwash initiation point, i.e., in the degree of clogging of the filter media bed required to trigger backwashing.

A further object is to provide a filter, including a filter compartment containing a bed of filter media, a fluid inlet conduit vented to the atmosphere and connected to the filter compartment, an underdrain beneath the bed of filter media, a backwash storage compartment connected to the underdrain, and means for initiating a backwash cycle when the inlet pressure in the filter compartment reaches a certain level; wherein the backwash initiation point is relatively independent of the flow through the bed. According to this invention, the filter is provided with means for detecting the fluid level in the backwash storage compartment, and means for adjusting the rate at which unfiltered fluid is supplied to the fluid inlet conduit in proportion to changes in the fluid level in the backwash storage compartment. As a result, as the demand on the filter increases, the fluid level in the backwash storage compartment must fall before the supply rate to the filter will increase. Since the filter outlet pressure varies with the backwash storage compartment fluid level, the fluid inlet pressure does not vary directly with the increase in pressure drop caused by increased flow through the bed.

Yet another object of this invention is to provide an automatically backwashed gravity filter which discharges filtered fluid to service before the backwash storage compartment is full.

A still further object is to provide a filter, including a filter compartment containing a bed of filter media, an inlet for unfiltered fluid above the bed, an underdrain beneath the bed, and a backwash storage compartment connected to the underdrain in which clearwell storage requirements are reduced. According to this invention, the filter is provided with means for controlling the rate at which unfiltered fluid is fed to the filter in response to changes in the fluid level in the backwash storage compartment, and with an outlet conduit through which filtered fluid is discharged while the backwash storage compartment is being filled. As a result clearwell storage requirements are reduced. In many cases, the clearwell storage tanks may be eliminated entirely.

DRAWINGS

DETAILED DESCRIPTION

Figure 1:
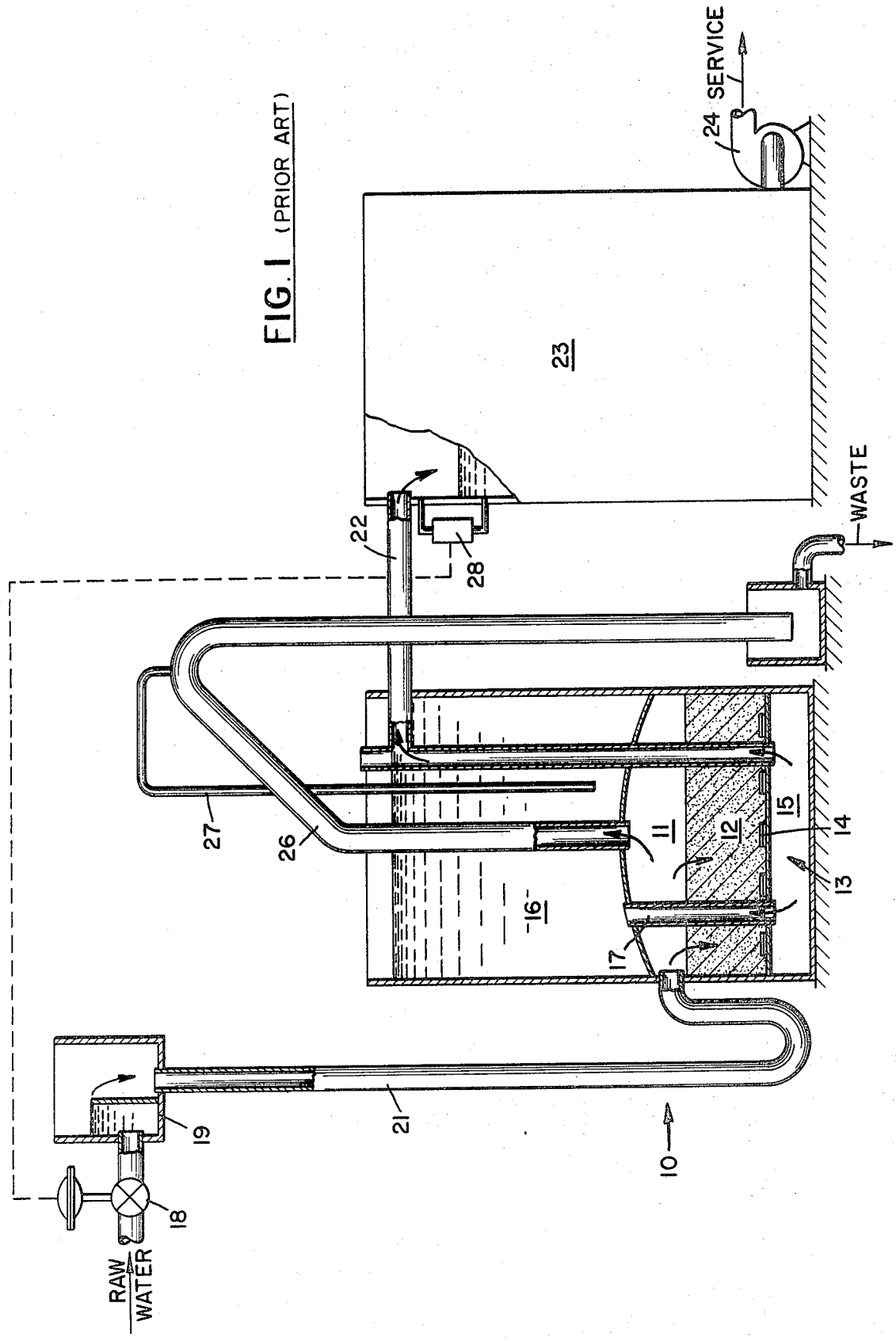
FIG. 1 illustrates a typical prior art gravity filter with automatic backwashing.

The filter 10 illustrated in FIG. 1, which is described in greater detail in the Beohner et al. patent listed above, includes a filter compartment 11 containing a bed 12 of sand, sand and gravel, or other suitable granular material, supported by an underdrain 13 which consists of a plate having a plurality of strainers 14 attached thereto. The underdrain opens into an underdrain compartment 15, while above the filter compartment 11 there is a backwash storage compartment 16. The underdrain compartment 15 is connected to the backwash storage compartment 16 by one or more tubes 17 which extend through the filter compartment 11. Unfiltered fluid, such as raw water, enters through an automatic control valve 18 connected to an open header box 19. From the header box 19 water spills into a fluid inlet conduit 21 which is connected to the filter compartment 11 above the bed of filter media. The water passes down through the bed, through the underdrain and into the underdrain compartment 15. During the first portion of each filtration cycle, the filtered water which collects in the underdrain compartment passes through tube 17 into the backwash storage compartment 16. When the fluid level in the backwash storage compartment reaches the point illustrated in FIG. 1, the filtered water passes through an outlet conduit 22, also vented to atmosphere, to a clearwell storage tank 23 from which it is pumped to service, i.e., to the processes in which it is used, by pump 24.

Once water begins to flow to the clearwell storage tank 23, the level in the backwash storage compartment remains substantially constant during the remainder of each filtration cycle. Since the underdrain compartment 15 is connected to the backwash storage compartment, the pressure in the underdrain compartment also remains substantially constant. As the bed 12 of filter media becomes clogged with impurities from the unfiltered water, the pressure drop across the bed and the pressure on the inlet side of filter compartment 11 gradually increase. As the inlet pressure increases the fluid level in the fluid inlet conduit 21 and in a backwash syphon tube 26 connected to the inlet side of filter compartment 11 also increase. When the level in syphon tube 26 reaches a certain point, the tube begins to suck water from the inlet side of the filter compartment and the water accumulated in the backwash storage compartment passes through tube 17 into the underdrain compartment 15, up through the filter media bed 12 and out through the backwash syphon tube 26. (Normally, additional syphon tubes, such as those illustrated in the above mentioned Beohner et al. patent, are used to provide positive initiation of the syphon). Backwashing continues until the level in the backwash storage compartment falls below the end of a syphon breaker 27. This breaks the syphon in tube 26, and water begins to flow down through the filter media bed 12 and up through tube 17 into the backwash storage compartment once more. When the backwash storage compartment has been filled, water begins to flow to the clearwell storage tank again.

The rate at which water is supplied to the filter 10 is controlled, by the automatic valve 18, through signals from an automatic level controller 28 mounted on the clearwell storage tank 23. As demand increases, the level in the clearwell storage tank drops and valve 18 is opened wider, thus feeding more water to header box 19 and fluid inlet conduit 21 and increasing the flow rate through the filter media bed 12. As the flow rate through the bed increases, the pressure on the inlet side of filter compartment 11 and the fluid level in the inlet fluid conduit 21 and backwash syphon tube 27 increase. Consequently, in this system, and in similar prior art systems, at higher flow rates backwashing is initiated sooner in the filtration cycle and the capacity of the filter media for removing impurities from the water is not utilized to the optimum extent.

Figure 2:
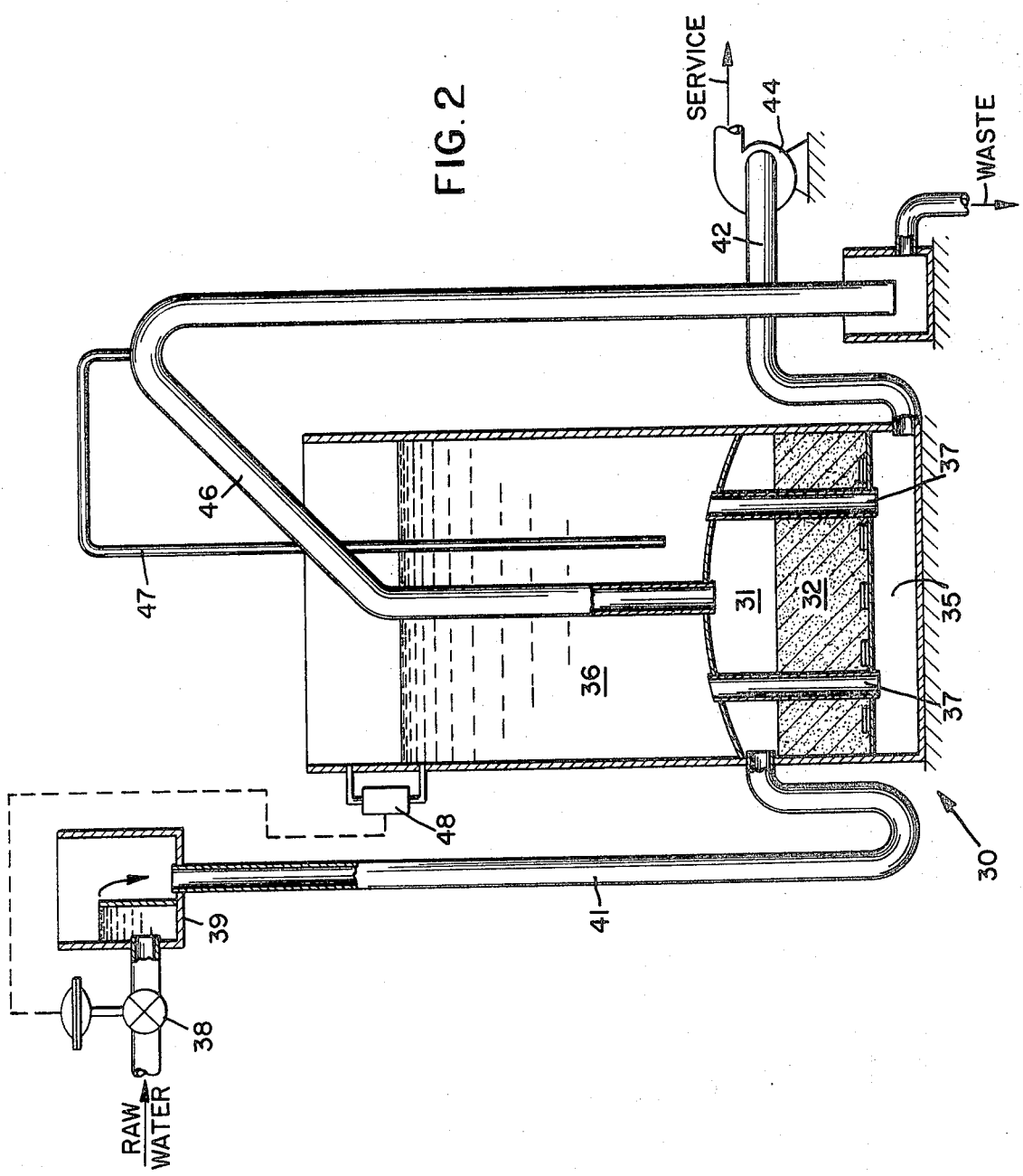
FIGS. 2 and 3 illustrate two embodiments of this invention.

In the embodiment of this invention illustrated in FIG. 2, the backwash initiation point is held relatively constant by mounting the automatic level controller 48 on the backwash storage compartment 36. Thus, as demand increases the level in the backwash storage compartment must fall before the rate at which water is supplied, through automatic control valve 38, to header box 39 and fluid inlet conduit 41 is increased. Consequently, instead of remaining constant, the pressure in the underdrain compartment 35 changes with the flow rate through the filter media bed 32. By adjusting the range of the automatic level controller 48 to correspond to the changes in pressure drop that occur over the expected range of flow rates, the increase in the pressure drops across the bed caused by an increase in flow rates can be compensated for by a decrease in the underdrain pressure. As a result, the pressure on the inlet side of the filter compartment 31 and the level in the backwash syphon tube 46 are relatively independent of the flow rate through the bed and the same amount of impurities in the filter media will be required to trigger backwashing in each filtration cycle. Thus, optimum utilization of the filter media is achieved and the dangers of reducing the purity of the filtered water at flow rates are avoided.

Another advantage of the filter shown in FIG. 2 is that there is no need to provide a large clearwell storage tank to achieve continuous service. This is accomplished by utilizing an outlet conduit 42 through which filtrate may be discharged before the maximum amount of filtered water has accumulated in the backwash storage compartment 36. In the system illustrated, one end of the outlet conduit 42 is connected to the underdrain compartment 35 while the other end of conduit 42 is connected to a pump 44 that pumps the filtered water directly to service. Thus, water can be discharged to service during the backwash cycle and while the backwash storage compartment is being filled.

In prior art systems such as the one illustrated in FIG. 1, continuous service required a clearwell storage tank having a minimum storage capacity, i.e., the volume between the line to pump 24 and the lower connection to automatic level controller 28, at least as large as the volume withdrawn at the maximum demand rate during the time required to backwash the filter and refill the backwash storage compartment. With typical flow rates, the clearwell storage tank 23 had to be about 20 percent larger than the backwash storage compartment to insure continuous service. In the apparatus illustrated in FIG. 2, continuous service may be achieved if the minimum storage capacity of the backwash storage compartment 36, i.e., the volume between the lower end of the syphon breaker 47 and the lower connection to controller 48, is at least as large as the volume required to backwash the bed 32 plus the volume withdrawn from the filter at the maximum demand rate during the backwash cycle. Typically, this volume can be provided by increasing the volume of the backwash storage compartment by about 20 percent (as compared to the volume of the backwash storage compartment 16 shown in FIG. 1). Thus, by increasing the size of the backwash storage compartment by 20 percent, one tank is eliminated and the total storage requirements of the system (backwash plus clearwell) are reduced from about 220 to about 120 percent of the backwash storage volume, or by about 45 percent.

In some cases, as for example where the filtered water is mixed with the water from other filters or from other types of processing equipment, it may still be desirable to use a clearwell storage tank. However, even in installations where a clearwell is desirable, the use of this invention makes it possible to reduce its size. Such an installation is illustrated in FIG. 3.

In this system, one end of the outlet conduit 62 is connected to the filter 50 at a point near the bottom of the backwash storage compartment 56 and the other end of the outlet conduit 62 is connected to a clearwell storage tank 63, from which the filtered water is pumped to service by pump 64. In this system, continuous service can be achieved if the minimum storage capacity of the backwash storage compartment 56 (the volume below the bottom connection to automatic level controller 68 and above the point where the outlet conduit is connected to the backwash service compartment) plus the minimum storage capacity of the clearwell storage tank 63 (the volume between the lower connection to controller 68 and the line to pump 64) is at least as great as the volume required to backwash the bed and the volume withdrawn at the maximum demand rate during the backwash cycle. As in the system shown in FIG. 2, this means a minimum total storage capacity of approximately 120 percent of the volume of the backwash storage compartment 16 of typical prior art filters, or a reduction in the total storage requirements of approximately 45 percent.

Figure 3:
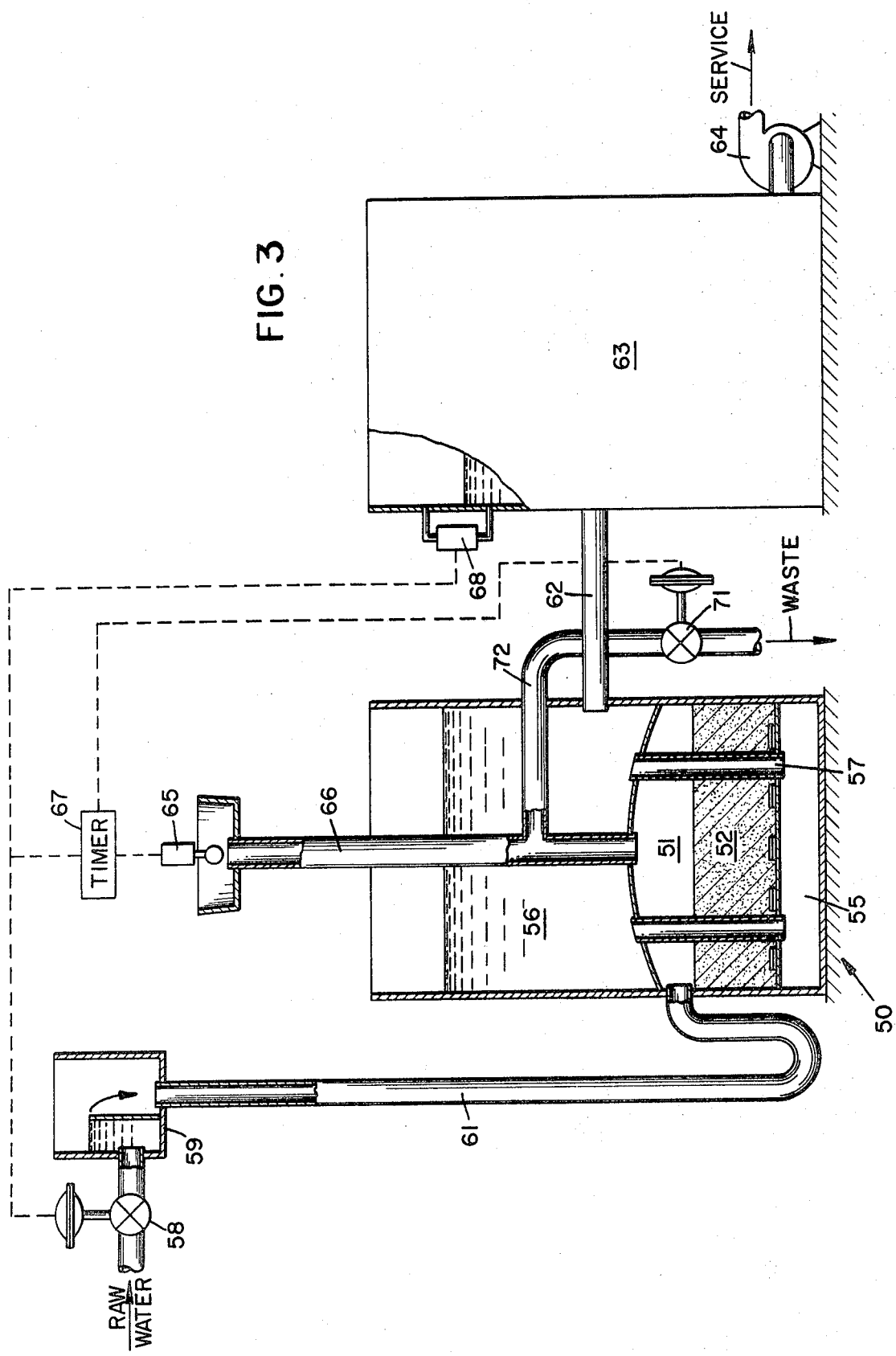

In the system shown in FIG. 3, the fluid level in the backwash storage compartment 56 is monitored by an automatic level controller 68 connected to the clearwell storage tank 63 above the point where the outlet conduit 62 is connected to the clearwell storage tank. Signals from controller 68 are used to open and close the automatic valve 58 that feeds unfiltered water to the open header box 59 and the fluid inlet conduit 61. Thus, the fluid levels in both the clearwell storage tank 63 and the backwash storage compartment 56 change with the rate at which water is withdrawn from the clearwell storage tank 63; and the pressure on the inlet side of the filter compartment 51 is relatively independent of the flow rate through the bed 52 of filter media. As a result, as in the system illustrated in FIG. 2, the point at which backwashing is initiated is not affected to any great extent by the flow rate during the filtration cycle.

In the system shown in FIG. 3, backwashing is initiated by a float switch 65 activated by rising fluid level in a stand pipe 66 connected to the inlet side of the filter compartment 51. Float switch 65 activates a timer 67 which opens a valve 71 in a backwash discharge conduit 72, whereupon water from the backwash storage compartment 56 and from the clearwell storage tank 63 passes through tube 57 into the underdrain compartment 55, up through the filter bed 52 and out through the backwash discharge conduit 72. At the same time, the timer closes the automatic supply valve 58, thereby conserving the unfiltered water. The timer is set to close valve 71 and end the backwash cycle after a predetermined interval.

It should be understood that the embodiments of this invention described above are merely illustrative and that many modifications may be made by those skilled in the art. For example, the controller 68 in FIG. 3 may be mounted on the backwash storage compartment 56. Also, the outlet conduit 62 in FIG. 3 may be connected to the underdrain compartment 55, or the outlet conduit 42 in FIG. 2 may be connected to the backwash storage compartment 36. Similarly, a pressure switch, such as is disclosed in the Johnson patent listed above, may be used in place of a syphon tube or float switch to initiate backwashing in either system. These and a variety of other modifications may be made within the scope of this invention, which is defined by the appended claims.

I claim:

1. In an automatically backwashed gravity filter including:

a filter compartment containing a bed of filter media, a fluid inlet conduit vented to the atmosphere and connected to the filter compartment, an underdrain beneath the bed of filter media, a backwash storage compartment located at a higher elevation than the bed of filter media and connected to the underdrain by an open conduit, whereby filtered fluid accumulates in the backwash storage compartment, and means for initiating a backwash cycle when the inlet pressure in the filter compartment reaches a certain level;

the improvement comprising:

sensing means positioned on said backwash storage compartment for detecting changes in the fluid level in said backwash storage compartment, and means responsive to said sensing means for increasing the rate at which unfiltered fluid is supplied to said fluid inlet conduit as the fluid level in said backwash storage compartment drops and decreasing the rate at which unfiltered fluid is supplied to said fluid inlet conduit as the fluid level in the backwash storage compartment rises.

2. A filter according to claim 1 wherein the sensing means for detecting changes in the fluid level in the backwash storage compartment comprises an automatic level controller.

3. A filter according to claim 2 wherein the means for increasing and decreasing the rate at which unfiltered fluid is supplied comprises an automatic control valve and means for opening and closing the valve in response to signals from the automatic level controller.

4. A filter according to claim 1 further comprising an outlet conduit through which filtered water is discharged while the backwash storage compartment is being filled.

5. In an automatically backwashed gravity filter including a filter compartment containing a bed of filter media, a fluid inlet conduit vented to the atmosphere and connected to the filter compartment, an underdrain beneath the bed of filter media, a backwash storage compartment located at a higher elevation than the bed of filter media and connected to the underdrain by an open conduit, whereby filtered fluid accumulates in the backwash storage compartment, a clearwell storage tank, and means for initiating a backwash cycle when the inlet pressure in the filter compartment reaches a certain level;

the improvement comprising:

an outlet conduit connected to said backwash storage compartment below the upper fluid level in said backwash storage compartment and connected to said clearwell storage tank below the upper fluid level in said clearwell storage tank;

sensing means positioned on said clearwell storage tank above said outlet conduit for detecting changes in the fluid level in said clearwell storage tank and in said backwash storage compartment; and means responsive to said sensing means for increasing the rate at which unfiltered fluid is supplied to said fluid inlet conduit as the fluid level in said backwash storage compartment drops and decreasing the rate at which unfiltered fluid is supplied to said fluid inlet conduit as the fluid level in the backwash storage compartment rises.

6. A filter according to claim 5 wherein the sensing means for detecting changes in the fluid level in the clearwell storage tank and the backwash storage compartment comprises an automatic level controller.

7. A filter according to claim 6 wherein the means for increasing and decreasing the rate at which unfiltered fluid is supplied comprises an automatic control valve and means for opening and closing the valve in response to signals from the automatic level controller.

* * * * *